United States Patent
Hong

(10) Patent No.: US 12,047,832 B2
(45) Date of Patent: Jul. 23, 2024

(54) MOBILITY MANAGEMENT METHODS AND APPARATUSES AND BASE STATIONS

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 491 days.

(21) Appl. No.: 17/419,146

(22) PCT Filed: Dec. 28, 2018

(86) PCT No.: PCT/CN2018/124850
§ 371 (c)(1),
(2) Date: Jun. 28, 2021

(87) PCT Pub. No.: WO2020/133209
PCT Pub. Date: Jul. 2, 2020

(65) Prior Publication Data
US 2022/0110043 A1     Apr. 7, 2022

(51) Int. Cl.
*H04W 36/32*  (2009.01)
*H04W 36/00*  (2009.01)
(Continued)

(52) U.S. Cl.
CPC ....... *H04W 36/32* (2013.01); *H04W 36/0061* (2013.01); *H04W 36/12* (2013.01); *H04W 92/20* (2013.01)

(58) Field of Classification Search
None
See application file for complete search history.

(56) References Cited

U.S. PATENT DOCUMENTS

2016/0183147 A1*  6/2016  Da Silva ............... H04W 36/22
                                                370/331
2016/0212666 A1*  7/2016  Zalzalah ............... H04W 36/14
(Continued)

FOREIGN PATENT DOCUMENTS

CN     106211204 A    12/2016
CN     106465139 A    2/2017
(Continued)

OTHER PUBLICATIONS

International Search Report Issued in Application No. PCT/CN2018/124850, Sep. 27, 2019 and English translation, (4p).
(Continued)

*Primary Examiner* — Chi H Pham
*Assistant Examiner* — Raul Rivas
(74) *Attorney, Agent, or Firm* — Arch & Lake LLP

(57) ABSTRACT

Mobility management methods, apparatuses, and base stations are provided. The method includes that, in response to setting up an inter-base station interface with a neighboring base station, a new radio unlicensed (NR-U) base station independently deployed in an unlicensed spectrum in a 5G new radio (NR) system sends a request message to the neighboring base station, where the request message requests to obtain unlicensed spectrum support capability information of the neighboring base station. Further, the NR-U base station determines response information of the neighboring base station to the request message and performs mobility management on user equipment in a serving cell according to the response information.

16 Claims, 6 Drawing Sheets

---

Send a request message to a neighboring base station when setting up an inter-base station interface with the neighboring base station — 11

Determine response information of the neighboring base station to the request message — 12

Perform mobility management on the user equipment in the service cell according to the response information — 13

(51) Int. Cl.
*H04W 36/12* (2009.01)
*H04W 92/20* (2009.01)

(56) References Cited

U.S. PATENT DOCUMENTS

| | | | |
|---|---|---|---|
| 2016/0227416 | A1 | 8/2016 | Suzuki et al. |
| 2017/0265172 | A1 | 9/2017 | Futaki |
| 2018/0176835 | A1 | 6/2018 | Park et al. |
| 2018/0263059 | A1 | 9/2018 | Rosa et al. |
| 2019/0191456 | A1* | 6/2019 | Koorapaty ........ H04W 74/0808 |

FOREIGN PATENT DOCUMENTS

| | | |
|---|---|---|
| CN | 106658721 A | 5/2017 |
| CN | 108696881 A | 10/2018 |
| JP | 2018056896 A | 4/2018 |
| WO | 2018141754 A1 | 8/2018 |
| WO | 2018204863 A1 | 11/2018 |

OTHER PUBLICATIONS

State Intellectual Property Office of the People's Republic of China, Office Action and Search Report Issued in Application No. 201880003381.5, Feb. 25, 2020, (22p). (Submitted with Machine Translation).

State Intellectual Property Office of the People's Republic of China, Office Action and Search Report Issued in Application No. 201880003381.5, Nov. 4, 2020, (22p). (Submitted with Machine Translation).

Huawei, "Cell selection for NR non-standalone and NR standalone UE operation", 3GPP TSG-RAN WG2 Meeting #96, Reno, Nevada, R2-168569, Nov. 14-18, 2016, (4p).

Samsung, "Issues for NR Unlicensed Non-standalone Operation",3GPP TSG-RAN WG2 Meeting#102, Busan, Korea, R2-1807649, May 21-25, 2018, (4p).

Ericsson,"NSA/SA NR cell indication in NR CGI reporting",3GPP TSG-RAN WG2 AH 1807,Montreal, Canada, R2-1809682, Jul. 2-6, 2018, 4 pages.

Nokia, Nokia Shanghai Bell, Qualcomm Incorporated, "Analysis of NR-U System impact", SA WG2 Meeting #129, Dongguan, China, S2-1810438, (revision of S2-181xxxx), Oct. 15-19, 2018, (2p).

State Intellectual Property Office of the People's Republic of China, Office Action and Search Report Issued in Application No. 2021106880344, Mar. 31, 2023, Submitted with Machine Translation, (21p).

Intellectual property India, Office Action Issued in Application No. 202147031544, May 31, 2023, Submitted with Partial Machine Translation, (7p).

State Intellectual Property Office of the People's Republic of China, Office Action and Search Report Issued in Application No. 202110688034.4, May 31, 2022, 20 pages.(Submitted with Machine Translation).

ISA State Intellectual Property Office of the People's Republic of China, Written Opinion of the International Searching Authority Issued in Application No. PCT/CN2018/124850, Sep. 27, 2019, WIPO, 9 pages.

European Patent Office, Extended European Search Report Issued in Application No. 18944976.2, Aug. 2, 2022, Germany, 36 pages.

State Intellectual Property Office of the People's Republic of China, Second Office Action and Search Report Issued in Application No. 202110688034.4, Oct. 26, 2022, Submitted with Machine/Partial Translation, (14p).

* cited by examiner

MOBILITY MANAGEMENT METHODS AND APPARATUSES AND BASE STATIONS

CROSS-REFERENCE TO RELATED APPLICATION

This application is the U.S. national phase application of International Application No. PCT/CN2018/124850, filed on Dec. 28, 2018, the disclosure of which is hereby incorporated by reference in its entirety for all purposes.

TECHNICAL FIELD

The present disclosure relates to the technical field of communications, and in particular to mobility management methods and apparatuses, and base stations.

BACKGROUND

With the development of wireless communication technologies, mobile communication networks have gradually evolved to a 5G NR (New Radio) system. Similar to LAA (License Enhanced Access, auxiliary access) technology in the 4G LTE (Long Term Evolution) system, 5G NR network also involves a technology of how to effectively utilize unlicensed spectrums such as a 2.4 GHz band, a 3.5 GHz band, a 6 GHz band, and a 5 GHz band, and other radio resources. Such technology is referred to as NR Unlicensed (NR-U) technology, which desires to use the 5G NR technology on an unlicensed spectrum.

The NR-U technology considers a plurality of deployment scenarios, for example, using NR in a licensed spectrum as a PCell (Primary Cell) and NR-U as an SCell (Secondary Cell) for carrier aggregation, or using the NR in the licensed spectrum as a PCell, or using the NR-U as a primary and secondary cell (PSCell) for dual connection, or configuring a standalone NR-U mode, etc. For the standalone NR-U mode, user equipment is required to support at least switching between the cells covered by signals from two standalone NR-U base stations and switching between the cells covered by signals from a base station in a licensed spectrum and from a base station in an unlicensed spectrum.

The standalone NR-U base station needs to store cell system information to be delivered to the user equipment having requested access so as to enable the user equipment to access the current cell normally, and therefore, the mobility management method of the NR-U base station needs to be studied.

SUMMARY

To overcome the problem in the related art, mobility management methods and apparatuses, and base stations are provided in examples of the present disclosure.

According to a first aspect of the present disclosure, a mobility management method, applied to an NR-U base station independently deployed in an unlicensed spectrum in a 5G NR system, is provided. The method includes that the NR-U base station sends a request message to a neighboring base station in response to setting up an inter-base station interface with the neighboring base station, where the request message requests to obtain unlicensed spectrum support capability information of the neighboring base station.

Further, the method includes that the NR-U base station determines response information of the neighboring base station to the request message and performs mobility management on user equipment in a serving cell according to the response information.

According to a second aspect of the present disclosure, a mobility management method is provided. The method includes that a base station in a 5G NR system receives a request message from a neighboring base station in response to setting up an inter-base station interface with the neighboring base station, where the request message requests to obtain unlicensed spectrum support capability information of the base station, and the neighboring base station is an NR-U base station deployed independently in an unlicensed spectrum in the 5G NR system.

Further, the method includes that the base station determines a response way to the request message according to the unlicensed spectrum support capability information of the base station, where the response way instructs the neighboring base station to perform mobility management on user equipment in a serving cell.

According to a third aspect of the present disclosure, a non-transitory computer readable storage medium having computer instructions stored thereon is provided, where the instructions are executed by a processor to implement the steps in the method according to the above first aspect.

According to a fourth aspect of the present disclosure, a non-transitory computer readable storage medium having computer instructions stored thereon is provided, where the instructions are executed by a processor to implement the steps in the method according to the second aspect of the present disclosure.

According to a fifth aspect of the present disclosure, a base station is provided, where the base station is a NR-U base station deployed independently in an unlicensed spectrum in a 5G NR system. The base station comprises a processor and a memory storing instructions executable by the processor.

Further, the processor is configured to: send a request message to a neighboring base station in response to setting up an inter-base station interface with the neighboring base station, where the request message requests to obtain unlicensed spectrum support capability information of the neighboring base station.

Moreover, the processor is configured to determine response information of the neighboring base station to the request message and perform mobility management on user equipment in a serving cell according to the response information.

According to a sixth aspect of the present disclosure, a base station is provided. The base station includes a processor and a memory storing instructions executable by the processor.

Further, the processor is configured to receive a request message from a neighboring base station in response to setting up an inter-base station interface with the neighboring base station, where the request message requests to obtain unlicensed spectrum support capability information of the base station, and the neighboring base station is an NR-U base station deployed independently in an unlicensed spectrum in the 5G NR system.

Moreover, the processor is configured to determine a response way to the request message according to the unlicensed spectrum support capability information of the base station, where the response way instructs the neighboring base station to perform mobility management on user equipment in a serving cell.

The technical solution of examples of the present disclosure can include the following technical effects.

In examples of the present disclosure, for a NR-U base station independently deployed in a unlicensed spectrum in a 5G NR system, when the NR-U base station sets up an inter-base station interface with a neighboring base station, it can send to the neighboring base station a request message for requesting to obtain unlicensed spectrum support capability information of the neighboring base station, and adopt correct mobility management strategy to manage UE in a serving cell after determining the unlicensed spectrum support capability information of the neighboring base station, which improves the accuracy of mobility management of the 5G NR system.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
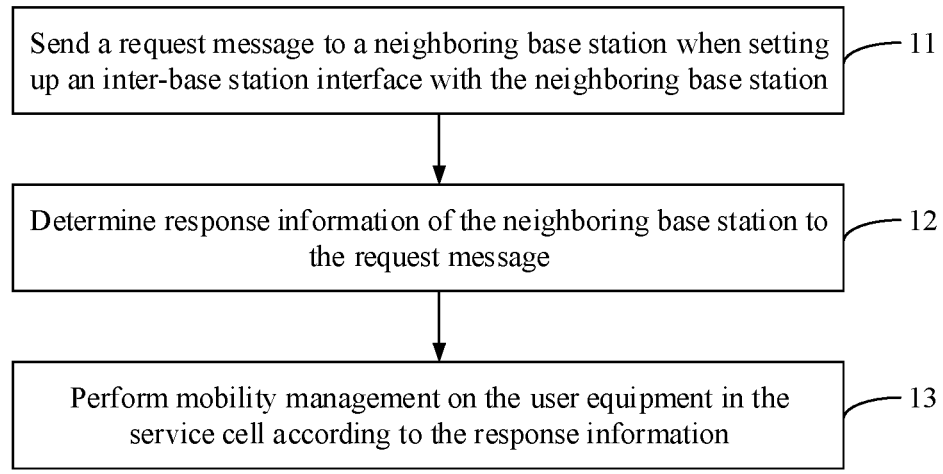
FIG. 1 is a flowchart illustrating a mobility management method according to an example of the present disclosure.

Examples will be described in detail herein, with the illustrations thereof represented in the drawings. When the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

The execution subject involved in the present disclosure includes: an NR-U base station independently deployed (i.e., in a standalone operation mode) in an unlicensed spectrum and a neighboring base station thereof in a 5G NR system, where the base station may be a base station or sub-base station provided with a large-scale antenna array, and so on. The neighboring base station next to the described standalone NR-U base station may be a NR base station deployed non-independently in the unlicensed spectrum, or a NR-U base station deployed independently. In a specific implementation process, the standalone NR-U base station and its neighboring base station are independent of each other and communicate with each other, and co-operate to achieve the technical solution provided by the present disclosure.

In the 5G NR system, the NR-U base station deployed independently in the unlicensed spectrum is characteristic in that: not relying on an NR base station in the licensed spectrum, and capable of being completely decoupled from the 5G NR licensed spectrum system; the standalone NR-U base station needs to store system information of a serving cell, and deliver the system information to UE (User Equipment) that needs to access the serving cell, so that the UE accesses a cell network based on the unlicensed spectrum resources.

For the base station deployed non-independently in the unlicensed spectrum, it is unnecessary to store the system information and deliver it to the UE in the cell where the base station per se is located.

An application scenario for mobility management of the present disclosure includes at least two types.

In a first type of application scenario, the standalone NR-U base station serves as a source base station, and its neighboring base station serves as a target base station; the standalone NR-U base station performs mobility management such as cell handover on the UE in the serving cell based on signal measurement information of the neighboring base station.

In a second type of application scenario, the standalone NR-U base station serves as a target base station, and its neighboring base station serves as a source base station; the neighboring base station performs mobility management such as cell handover on the UE in the serving cell based on signal measurement result of the target base station, i.e., the standalone NR-U base station.

Based on this, the present disclosure provides a mobility management method, which can be applied to an NR-U base station deployed independently in an unlicensed spectrum in a 5G NR system.

Referring to FIG. 1 for a flowchart of a mobility management method according to an example, and the method may include the following steps.

In step 11, when an inter-base station interface is set up with a neighboring base station, a request message is sent to the neighboring base station, where the request message is used for requesting to obtain unlicensed spectrum support capability information of the neighboring base station.

In a mobile communication network, different base stations can perform direct communication therebetween by setting up an inter-base station interface such as an Xn interface.

In an example of the present disclosure, take an NR-U base station "A" supporting an independent deployment mode in an unlicensed spectrum as an example for description. If the NR-U base station "A" wants to perform mobility management on the UE in the serving cell, it is required to firstly obtain the capability information of the neighboring base station, so as to determine whether the neighboring base station can be used as a candidate measurement base station.

Therefore, when the NR-U base station "A" sets up an inter-base station interface with the neighboring base station, it sends to the neighboring base station a preset request message for requesting to obtain the unlicensed spectrum support capability information of the neighboring base station.

Assuming that the described neighboring base station is base station "B", the unlicensed spectrum support capability information of base station "B", which the NR-U base station "A" wants to obtain, mainly includes an unlicensed spectrum support capability and a deployment mode in an unlicensed spectrum.

The unlicensed spectrum support capability may include preset capability indication information for indicating whether the base station supports operation in the unlicensed spectrum, and/or a supported operation frequency range in the unlicensed spectrum.

The preset capability indication information may be a preset code, preset bit information, etc. Exemplarily, a character "Y" can be used to indicate support operation in the unlicensed spectrum NR-U; a character "N" can be used to indicate that the present base station does not support operation in the unlicensed spectrum NR-U. The preset capability indication information may include "Y" and "N".

The deployment mode in the unlicensed spectrum is used to indicate what the deployment mode (also referred to as Operation Mode) is in the operation frequency range of the unlicensed spectrum when the base station supports operation in the unlicensed spectrum.

In an example of the present disclosure, based on protocol stipulations of the 5G NR system on how to set up an inter-base station interface, a newly-added inter-base station interface may be used for inter-base station communication. That is, the NR-U base station "A" may send the request message to the neighboring base station through the newly-added inter-base station interface.

Figure 2:
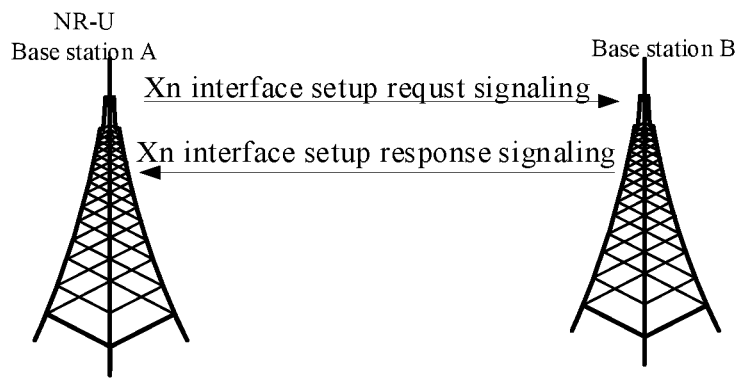
FIG. 2 is a schematic diagram illustrating an application scenario where uplink information is transmitted according to an example of the present disclosure.

In another example of the present disclosure, if the 5G NR system conforms to relevant protocol stipulations for setting up an inter-base station interface in the LTE system, the NR-U base station "A" may send the request message to the neighboring base station through a preset Xn interface. Compared with the Xn interface in the original LTE system, the preset Xn interface is an enhanced Xn interface, and the request message may be sent to a neighboring base station through a preset Xn interface step request signaling, i.e. Xn SETUP REQUEST signaling. Refer to FIG. 2 for a schematic diagram of an application scenario for mobility management according to an example.

In another example of the present disclosure, when the NR-U base station "A" sends the request message to the base station "B" through the Xn SETUP REQUEST signaling for the preset Xn interface, the request message may further carry unlicensed spectrum support capability information of the NR-U base station "A". Thus, after receiving the request message, the neighboring base station "B" determines whether to respond to the request message according to the unlicensed frequency band support capability information of the NR-U base station "A", and determines how to perform mobility management on the UE within the serving cell.

For example, the unlicensed spectrum support capability information of the NR-U base station "A" may include: an unlicensed spectrum operation frequency range f1 of the NR-U base station "A", for example, f1 is 5000 mhz~5500 mhz; an independent deployment mode in f1.

In an example of the present disclosure, the NR-U base station "A" can also use values of a specified bit to represent different deployment modes according to a preset protocol. Take a bit at a specified position in the preset Xn SETUP REQUEST signaling as an example. When the bit is set to 0, it can indicate that the non-independent deployment mode is supported within the unlicensed operation frequency range; when the bit is set to 1, it can indicate that the independent deployment mode, namely Standalone NR-U mode, is supported within the unlicensed operation frequency range.

In step 12, response information of the neighboring base station to the request message is determined.

In the present disclosure, after the neighboring base station (such as the base station "B") receives the request message sent by the NR-U base station "A", it can determine whether to respond to the above request message according to its own unlicensed spectrum support capability information.

In the present disclosure, depending on whether the NR-U base station "A" can receive the response message of the neighboring base station, the implementation of the above step 12 may include at least two ways as follows.

In a first way, the standalone NR-U base station "A" can receive the response message from the base station "B" to the above request message, and determine response information of the neighboring base station to the request message in an explicit way.

Figure 3:
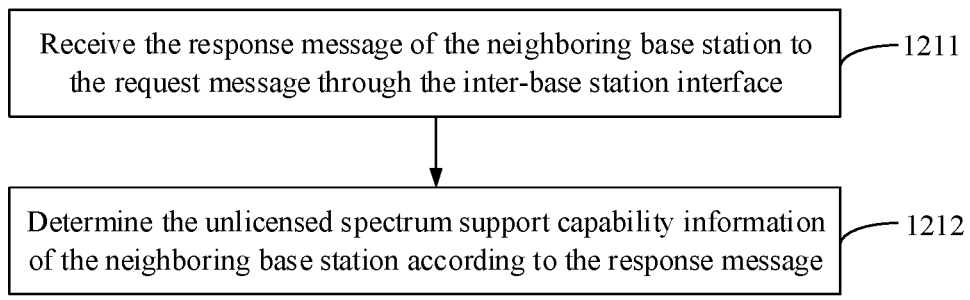
FIG. 3 is a flowchart illustrating another mobility management method according to an example of the present disclosure.

Referring to FIG. 3 for a flowchart of another mobility management method according to an example, the above step 12 may include the following steps.

In step 1211, the response message of the neighboring base station to the request message through the inter-base station interface is received.

Corresponding to the way of sending the request in the above step 11, the standalone NR-U base station "A" can receive the response message of the neighboring base station to the request message through the preset Xn interface, for example, receiving the response message of the neighboring base station to the request message through the preset Xn SETUP RESPONSE signaling.

Or, the response message of the neighboring base station to the request message is received through a newly-added inter-base station interface.

In step 1212, the unlicensed spectrum support capability information of the neighboring base station is determined according to the response message.

As shown in the above example, the standalone NR-U base station "A" can clearly determine whether the neighboring base station supports operation in the unlicensed spectrum of the NR system through the response message sent by the neighboring base station, and determine the supported operation frequency range in the unlicensed spectrum and deployment mode information.

In a second way, the standalone NR-U base station "A" can determine, in an implicit way, the above response information through system regulations.

Figure 4:
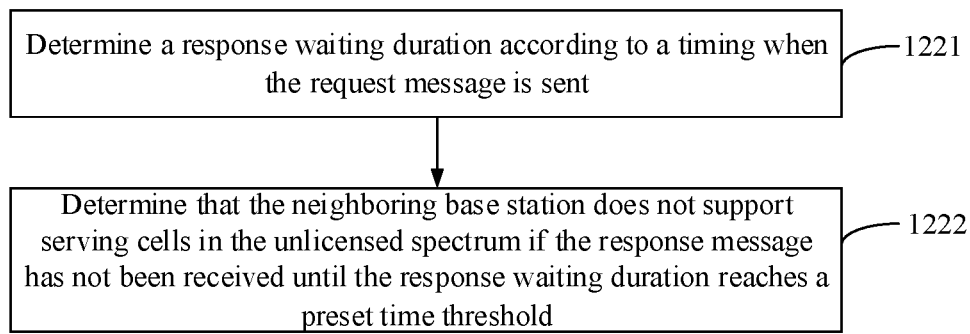
FIG. 4 is a flowchart illustrating another mobility management method according to an example of the present disclosure.

Referring to FIG. 4 for a flowchart of another mobility management method according to an example, the above step 12 may include the following steps.

In step 1221, a response waiting duration is determined according to a timing when the request message is sent.

Assuming that the NR-U base station "A" sends the above request message to base station "B" at a timing t1, the NR-U base station "A" can start a timer at the timing t1 or after a preset duration Δt from the timing t1, so as to calculate the duration for waiting for the response message, that is, the response waiting duration T.

In step 1222, if the response message has not been received until the response waiting duration reaches a preset time threshold, it is determined that the neighboring base station does not support serving cells in the unlicensed spectrum.

For example, if the NR-U base station "A" has not received the response message from the base station "B" until the response waiting duration T reaches a preset time threshold, such as 30 s, then the NR-U base station "A" can determine that base station "B" does not support serving cells in the unlicensed spectrum according to the preset system rules, so as to avoid excessive power consumption caused by the NR-U base station "A" waiting for the response message of the base station "B" for a long time and achieve the purpose of energy saving.

In step 13, mobility management is performed on the user equipment in the service cell according to the response information.

After the NR-U base station "A" determines the unlicensed spectrum support capability information of the neighboring base station according to the response information, it can determine how to perform the mobility management on the served UE according to the unlicensed spectrum support capability information of the neighboring base station.

Taking that the above mobility management refers to the cell handover as an example, as shown in FIG. 2, when the NR-U base station "A" determines a candidate base station for handover measurement for the served UE, it will send a request message through an inter-base station interface such as a preset Xn interface by a preset Xn interface setup request signaling (that is, the preset Xn SETUP REQUEST signaling), and receive a response message of the base station "B" to the above request message through a preset Xn interface setup response signaling (that is, the preset Xn SETUP RESPONSE signaling).

If the response message of the base station "B" indicates that the base station "B" does not support the independent deployment NR-U mode, for example, the base station "B" only supports operation in the licensed spectrum of 5G NR system, the base station "B" supports operation in the unlicensed spectrum but does not support the independent deployment mode, and so on, when NR-U UE1 in the cell served by the NR-U base station "A" needs to perform handover measurement, the NR-U base station "A" does not inform NR-U UE1 to take the base station "B" as the candidate base station for handover measurement, i.e., does not inform NR-U UE1 to take the neighboring base station as a target base station for signal measurement. The above NR-U UE1 is user equipment (i.e., NR-U UE) operating in a standalone unlicensed spectrum, and cannot operate in a licensed spectrum.

Figure 5:
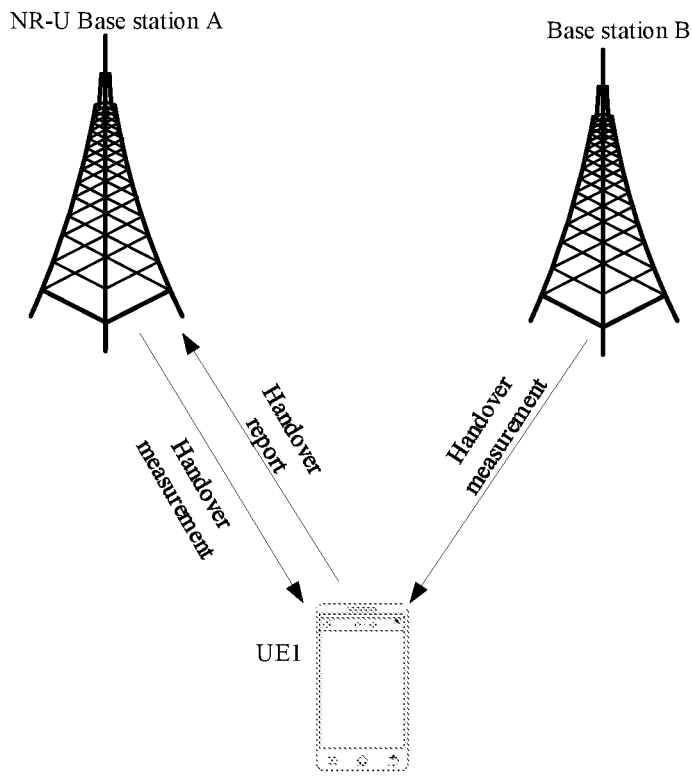
FIG. 5 is a schematic diagram illustrating another application scenario for mobility management according to an example of the present disclosure.

On the contrary, if the response message of the base station "B" indicates that the base station "B" supports the independent deployment NR-U mode, then when UE1 needs to perform handover measurement, the NR-U base station "A" will inform NR-U UE1 to take the above base station "B" as a candidate base station for handover measurement so as to perform handover measurement and prepare for cell handover. Refer to FIG. 5 for a schematic diagram illustrating another application scenario for mobility management according to an example, and the application scenario corresponds to the first type of application scenario, where the standalone NR-U base station "A" is a source base station and the neighboring base station "B" is a target base station.

Similarly, in the above second type of application scenario, the base station "B" obtains the unlicensed spectrum support capability information of the NR-U base station "A" through the request message, and if the base station "B" does not support the independent deployment NR-U mode, when the base station "B" determines the base station for handover measurement for the UE in the cell served by the base station "B" (also referred to as serving cell), it will not inform the UE in the serving cell of the base station identifier of the base station "A".

It can be seen that in the present disclosure, for a NR-U base station independently deployed in a 5G NR system, when the NR-U base station sets up an inter-base station interface with a neighboring base station, it can send to the neighboring base station a request message for obtaining unlicensed spectrum support capability information of the neighboring base station, and adopt correct mobility management strategy to manage UE in a serving cell after determining the unlicensed spectrum support capability information of the neighboring base station, which improves the accuracy of mobility management of the 5G NR system.

Accordingly, the present disclosure also provides a mobility management method on the corresponding neighboring base station side. The neighboring base station can be any base station in the mobile communication network, for example, an independently deployed NR-U base station or a non-independently deployed NR base station.

Figure 6:
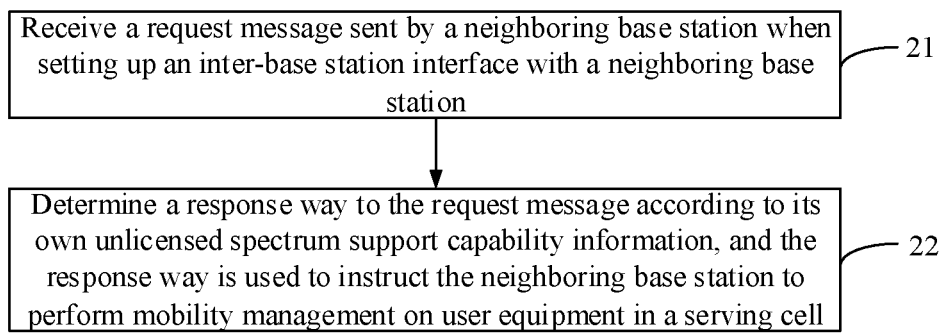
FIG. 6 is a flowchart illustrating a mobility management method according to an example of the present disclosure.

Refer to FIG. 6 for a flowchart of a mobility management method according to an example, where the method may include the following steps.

In step 21, when setting up an inter-base station interface with a neighboring base station, the request message sent by the neighboring base station is received, and the request message is used to request to obtain unlicensed spectrum support capability information of the base station. The neighboring base station is a NR-U base station independently deployed in an unlicensed spectrum in the 5G NR system.

This step 21 corresponds to the above step 11, and the specific implementation may refer to the description of the above step 11.

In an example of the present disclosure, the unlicensed spectrum support capability information can also include: an unlicensed spectrum support capability and a deployment mode in an unlicensed spectrum.

The unlicensed spectrum support capability includes: preset capability indication information for indicating whether the base station supports operation in the unlicensed spectrum, and/or an operation frequency range in the unlicensed spectrum.

The deployment mode in the unlicensed spectrum includes: an independent deployment mode or a non-independent deployment mode.

In step 22, the base station determines a response way to the request message according to its own unlicensed spectrum support capability information, and the response way is used to instruct the neighboring base station to perform mobility management on user equipment in a serving cell.

Corresponding to the above two ways of step 12, step 22 may include the following two implementations.

Implementation 1: corresponding to the first way in step 12, the base station can send a response message to the request message to the neighboring base station through a preset inter-base station interface according to its own unlicensed spectrum support capability information.

The present base station, such as the base station "B", can send the response message to the neighboring base station through the preset Xn interface; or send the response message to the neighboring base station through a newly-added inter-base station interface.

In another example of the present disclosure, if the present base station sends the response message to the neighboring base station through the preset Xn interface, the response message may be sent to the neighboring station through a preset Xn interface setup response signaling (that is, the preset Xn SETUP RESPONSE signaling), which can also be called an improved Xn SETUP RESPONSE signaling.

Implementation 2: corresponding to the second way in step 12, if the present base station does not support the independent deployment mode in the unlicensed spectrum, it can refuse to respond to the request message.

In another example of the present disclosure, the request message also includes: mode indication information and unlicensed spectrum support capability information of the neighboring base station.

The mode indication information is used to indicate the independent deployment mode of the neighboring base station in the unlicensed spectrum.

The unlicensed spectrum support capability information is used to indicate an operation frequency range of the neighboring base station in the unlicensed spectrum.

Figure 7:
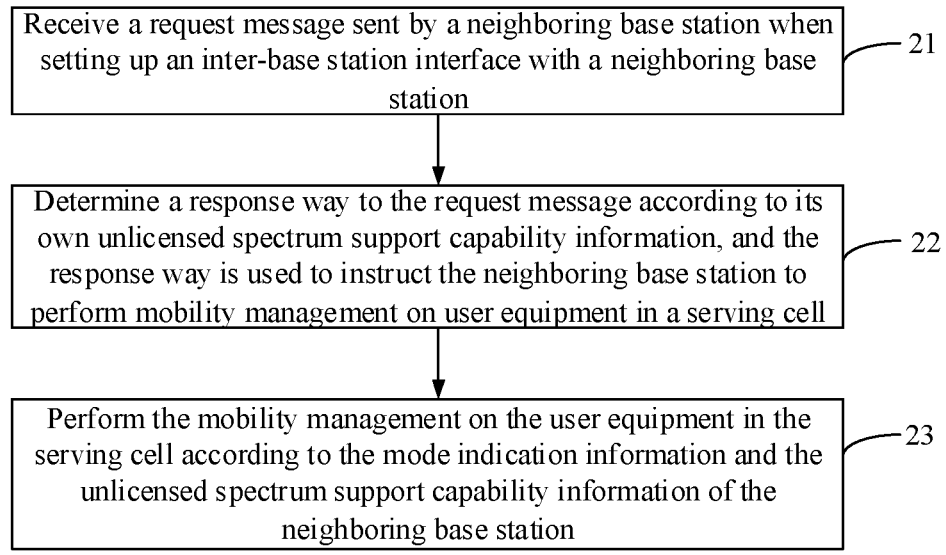
FIG. 7 is a flowchart illustrating another mobility management method according to an example of the present disclosure.

Accordingly, refer to FIG. 7 for the flowchart of another mobility management method according to an example, and the method may also include the following.

In step 23, the mobility management is performed on the user equipment in the serving cell according to the mode indication information and the unlicensed spectrum support capability information of the neighboring base station.

Figure 8:
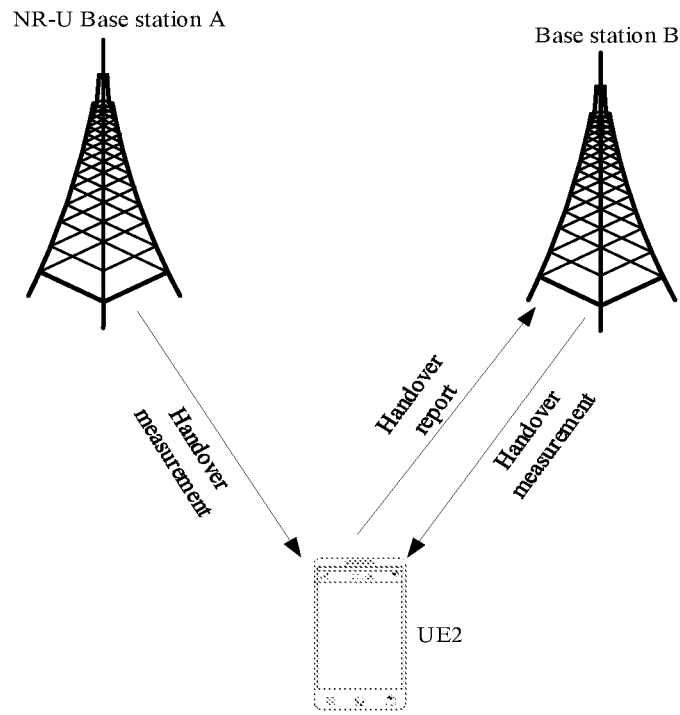
FIG. 8 is a schematic diagram illustrating another application scenario for mobility management according to an example of the present disclosure.

For example, refer to FIG. 8 for the schematic diagram illustrating another application scenario for mobility management according to an example. If the base station "B" also supports the independent deployment mode in the unlicensed spectrum, or the base station "B" is also a standalone NR-U base station, when UE2 in its serving cell needs to perform handover measurement, the base station "B" will inform UE2 to take the above NR-U base station "A" as the candidate base station for handover measurement, that is, informing UE2 to take the neighboring base station as a target base station for signal measurement.

For the sake of simple description, the above method examples are described as one or more combinations of a series of actions. However, those skilled in the art should know that the present disclosure is not limited by the described action sequence, because some steps can be performed in other sequences or at the same time according to the present disclosure.

Secondly, those skilled in the art should also know that the examples described in the description are all optional examples, and the actions and modules involved are not necessarily needed for the present disclosure.

Corresponding to the method examples for implementing the above application functions, the present disclosure also provides apparatus examples for implementing the above application functions and examples of corresponding user equipment.

Accordingly, the present disclosure also provides a mobility management apparatus, which is applied in an NR-U base station independently deployed in an unlicensed spectrum in a 5G NR system.

Figure 9:
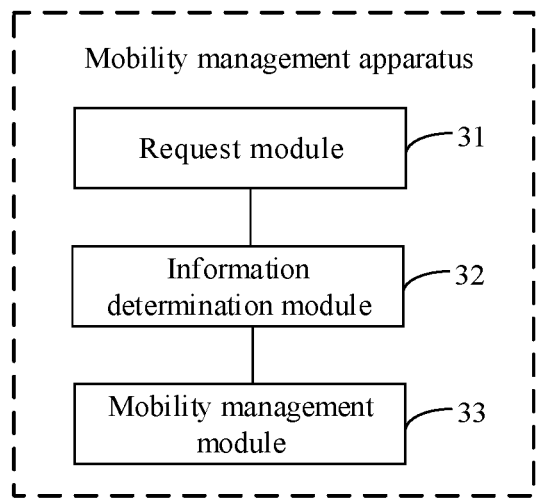
FIG. 9 is a block diagram illustrating a mobility management apparatus according to an example of the present disclosure.

Refer to FIG. 9 for a block diagram illustrating a mobility management apparatus according to an example of the present disclosure, and the apparatus may include the following modules.

A request module 31 is configured to send a request message to a neighboring base station when setting up an inter-base station interface with the neighboring base station, where the request message is used for requesting to obtain unlicensed spectrum support capability information of the neighboring base station;

the unlicensed spectrum support capability information includes an unlicensed spectrum support capability and a deployment mode in an unlicensed spectrum;

the unlicensed spectrum support capability includes: preset capability indication information for indicating whether the base station supports operation in the unlicensed spectrum, and/or an operation frequency range of the base station in the unlicensed spectrum; the deployment mode in the unlicensed spectrum includes an independent deployment mode or a non-independent deployment mode.

In another apparatus example of the present disclosure, the request message sent by the request module 31 further includes: mode indication information and unlicensed spectrum support capability information of the NR-U base station;

the mode indication information is used to indicate an independent deployment mode of the NR-U base station in the unlicensed spectrum; the unlicensed spectrum support capability information is used to indicate an operation frequency range of the NR-U base station in the unlicensed spectrum.

An information determination module 32 is configured to determine response information of the neighboring base station to the request message.

A mobility management module 33 is configured to perform mobility management on user equipment in a serving cell according to the response information.

In another apparatus example of the present disclosure, the request module 31 further includes:
a first request sub-module configured to send the request message to the neighboring base station through a preset Xn interface; or a second request sub-module configured to send the request message to the neighboring base station through a newly added inter-base station interface.

In another apparatus example of the present disclosure, the first request sub-module is further configured to send the request message to the neighboring base station through a preset Xn interface setup request signaling.

Figure 10:
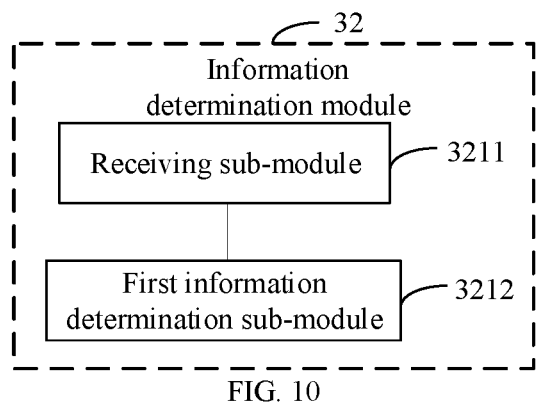
FIG. 10 is a block diagram illustrating another mobility management apparatus according to an example of the present disclosure.

Refer to FIG. 10 for a block diagram illustrating another mobility management apparatus according to an example. On basis of the apparatus example shown in FIG. 9, the information determination module 32 may include:
- a receiving sub-module 3211 configured to receive a response message of the neighboring base station to the request message through the inter-base station interface;
- a first information determination sub-module 3212 configured to determine the unlicensed spectrum support capability information of the neighboring base station according to the response message.

In another apparatus example of the present disclosure, the receiving sub-module 3211 may include:
- a first receiving unit configured to receive a response message of the neighboring base station to the request message through a preset Xn interface; or
- a second receiving unit configured to receive a response message of the neighboring base station to the request message through a newly added inter-base station interface.

In another apparatus example of the present disclosure, the first receiving unit is configured to receive a response message of the neighboring base station to the request message through a preset Xn interface setup response signaling.

Figure 11:
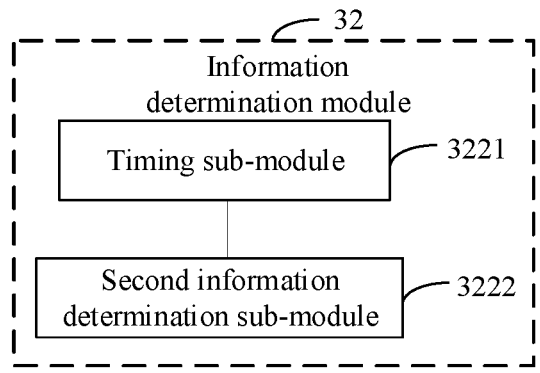
FIG. 11 is a block diagram illustrating another mobility management apparatus according to an example of the present disclosure.

Refer to FIG. 11 for a block diagram illustrating another mobility management apparatus according to an example. On basis of the apparatus example shown in FIG. 9, the information determination module 32 may include:
- a timing sub-module 3221 configured to determine a response waiting duration according to a timing when the request message is sent;
- a second information determination sub-module 3222 is configured to, if no response message is received until the response waiting duration is equal to a preset time threshold, determine that the neighboring base station does not support serving a cell in the unlicensed spectrum.

Accordingly, the present disclosure further provides another mobility management apparatus, provided in a base station in a 5G new radio (NR) system.

Figure 12:
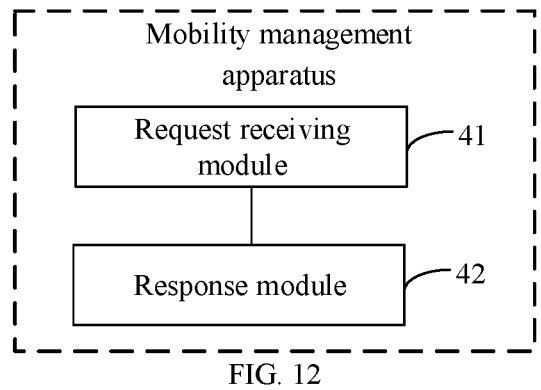
FIG. 12 is a block diagram illustrating a mobility management apparatus according to an example of the present disclosure.

Refer to FIG. 12 for a block diagram illustrating a mobility management apparatus according to an example, and the apparatus may include:
- a request receiving module 41 configured to receive a request message from a neighboring base station when setting up an inter-base station interface with the neighboring base station, where the request message is used for requesting to obtain unlicensed spectrum support capability information of the base station, and the neighboring base station is an NR-U base station deployed independently in an unlicensed spectrum in the 5G NR system;
- the unlicensed spectrum support capability information comprises an unlicensed spectrum support capability and a deployment mode in an unlicensed spectrum;
- the unlicensed spectrum support capability includes: preset capability indication information for indicating whether the base station supports operation in the unlicensed spectrum, and/or an operation frequency range of the base station in the unlicensed spectrum;
- the deployment mode in the unlicensed spectrum includes an independent deployment mode or a non-independent deployment mode.

A response module 42 is configured to determine a response way to the request message according to the unlicensed spectrum support capability information of the base station, where the response way is used for instructing the neighboring base station to perform mobility management on user equipment in a serving cell.

Figure 13:
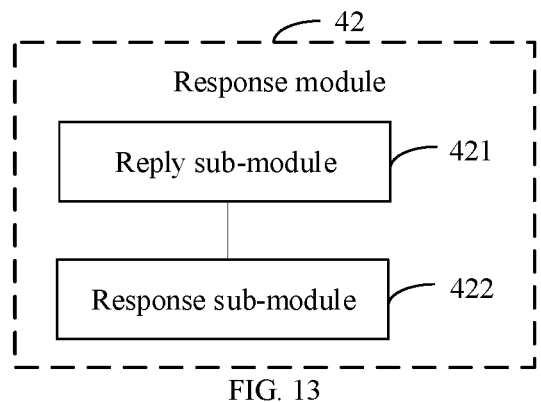
FIG. 13 is a block diagram illustrating another mobility management apparatus according to an example of the present disclosure.

Refer to FIG. 13 for a block diagram illustrating another mobility management apparatus according to an example. On basis of the apparatus example shown in FIG. 12, the response module 42 may include:
- a reply sub-module 421 configured to send a response message to the request message to the neighboring base station through a preset inter-base station interface according to the unlicensed spectrum support capability information of the base station; or
- a response sub-module 422 configured to refuse to respond to the request message when the base station does not support the independent deployment mode in the unlicensed spectrum.

In another apparatus example of the present disclosure, the above reply sub-module 421 may include:
- a first reply unit configured to send the response message to the neighboring base station through a preset Xn interface; or
- a second reply unit configured to send the response message to the neighboring base station through a newly added inter-base station interface.

In another apparatus example of the present disclosure, the first reply unit is configured to send the response message to the neighboring base station through a preset Xn interface setup response signaling.

In another apparatus example of the present disclosure, the request message received by the request receiving module 41 further includes: mode indication information and unlicensed spectrum support capability information of the neighboring base station;
- the mode indication information is used to indicate an independent deployment mode of the neighboring base station in the unlicensed spectrum;
- the unlicensed spectrum support capability information is used to indicate an operation frequency range of the neighboring base station in the unlicensed spectrum.

Figure 14:
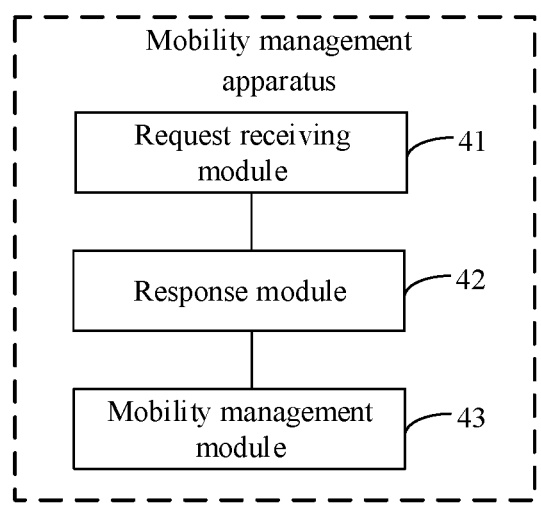
FIG. 14 is a block diagram illustrating another mobility management apparatus according to an example of the present disclosure.

Refer to FIG. 14 for a block diagram illustrating another mobility management apparatus according to an example. On basis of the apparatus example shown in FIG. 12, the apparatus may further include:
- a mobility management module 43 configured to perform mobility management on user equipment in a serving cell according to the mode indication information and the unlicensed spectrum support capability information of the neighboring base station.

Since the apparatus examples substantially correspond to the method examples, a reference can be made to part of the descriptions of the method examples for the related part. The apparatus examples described above are merely illustrative, where the units described as separate members can be or not be physically separated, and the members displayed as units can be or not be physical units, e.g., can be located in one place, or can be distributed to a plurality of network units. Part or all of the modules can be selected according to actual requirements to implement the objectives of the solutions in the examples. Those of ordinary skill in the art can understand and carry out them without creative work.

Accordingly, in one aspect, a base station is provided, where the base station is a NR-U base station deployed independently in an unlicensed spectrum in a 5G new radio (NR) system, and includes:

a processor;

a memory storing instructions executable by the processor;

where the processor is configured to:

send a request message to a neighboring base station when setting up an inter-base station interface with the neighboring base station, where the request message is used for requesting to obtain unlicensed spectrum support capability information of the neighboring base station;

determine response information of the neighboring base station to the request message;

perform mobility management on user equipment in a serving cell according to the response information.

In another aspect, the present disclosure further provides another base station applied in a 5G NR system, including:

a processor;

a memory storing instructions executable by the processor;

where the processor is configured to:

receive a request message from a neighboring base station when setting up an inter-base station interface with the neighboring base station, where the request message is used for requesting to obtain unlicensed spectrum support capability information of the base station, and the neighboring base station is an NR-U base station deployed independently in an unlicensed spectrum in the 5G NR system;

determine a response way to the request message according to the unlicensed spectrum support capability information of the base station, where the response way is used for instructing the neighboring base station to perform mobility management on user equipment in a serving cell.

Figure 15:
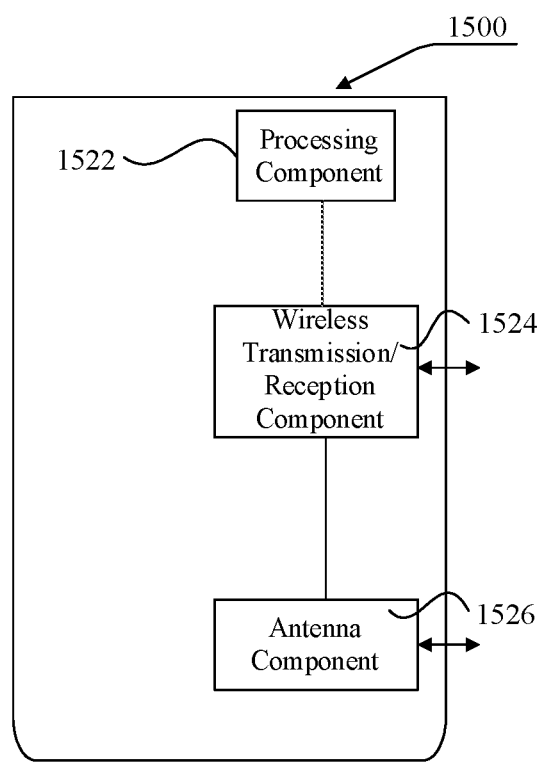
FIG. 15 is a schematic structural diagram of a base station according to an example of the present disclosure.

FIG. 15 is a schematic structural diagram illustrating a base station 1500 according to an example. As shown in FIG. 15, the base station 1500 includes a processing component 1522, a wireless transmission/reception component 1524, an antenna component 1526, and a signal processing part specific to wireless interfaces. The processing component 1522 further includes one or more processors.

One processor of the processing component 1522 can be configured to:

send a request message to a neighboring base station when setting up an inter-base station interface with the neighboring base station, where the request message is used for requesting to obtain unlicensed spectrum support capability information of the neighboring base station;

determine response information of the neighboring base station to the request message;

perform mobility management on user equipment in a serving cell according to the response information;

or, receive a request message from a neighboring base station when setting up an inter-base station interface with the neighboring base station, where the request message is used for requesting to obtain unlicensed spectrum support capability information of the base station, and the neighboring base station is an NR-U base station deployed independently in an unlicensed spectrum in the 5G NR system;

determine a response way to the request message according to the unlicensed spectrum support capability information of the base station, where the response way is used for instructing the neighboring base station to perform mobility management on user equipment in a serving cell.

In an example, a non-transitory computer-readable storage medium including instructions is provided, such as a memory including the instructions. The instructions can be executed by the processing component 1522 of the base station 1500 to complete the mobility management method illustrated in any of FIG. 1-FIG. 7. For example, the non-transitory computer-readable storage medium can be a ROM, a random access memory (RAM), a CD-ROM, a magnetic tape, a floppy disk, an optical data storage device, or the like.

The technical solution of examples of the present disclosure can include the following technical effects.

In examples of the present disclosure, for a NR-U base station independently deployed in a unlicensed spectrum in a 5G NR system, when the NR-U base station sets up an inter-base station interface with a neighboring base station, it can send to the neighboring base station a request message for requesting to obtain unlicensed spectrum support capability information of the neighboring base station, and adopt correct mobility management strategy to manage UE in a serving cell after determining the unlicensed spectrum support capability information of the neighboring base station, which improves the accuracy of mobility management of the 5G NR system.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

What is claimed is:

1. A mobility management method, comprising:

sending, by a new radio unlicensed (NR-U) base station independently deployed in an unlicensed spectrum in a 5G new radio (NR) system, a request message to a neighboring base station in response to setting up an inter-base station interface with the neighboring base station, wherein the request message requests to obtain unlicensed spectrum support capability information of the neighboring base station;

determining, by the NR-U base station, response information of the neighboring base station to the request message; and performing, by the NR-U base station, mobility management on user equipment in a serving cell according to the response information, wherein the unlicensed spectrum support capability information comprises an unlicensed spectrum support capability and a deployment mode in an unlicensed spectrum;

wherein the unlicensed spectrum support capability comprises at least one of following parameters: preset capability indication information for indicating whether the base station supports operation in the unlicensed spectrum, or an operation frequency range of the base station in the unlicensed spectrum;

wherein the deployment mode in the unlicensed spectrum comprises an independent deployment mode or a non-independent deployment mode; and wherein if the response information indicates that the neighboring base station supports an independent deployment NR-U mode, the response information is used for the NR-U base station to determine to inform NR-U user equipment in the serving cell to take the neighboring base station as a candidate base station for handover measurement.

2. The method according to claim 1, wherein the request message further comprises: mode indication information and unlicensed spectrum support capability information of the NR-U base station;

wherein the mode indication information indicates an independent deployment mode of the NR-U base station in the unlicensed spectrum; wherein the unlicensed spectrum support capability information indicates an operation frequency range of the NR-U base station in the unlicensed spectrum.

3. The method according to claim 1, wherein sending the request message to the neighboring base station comprises:

sending the request message to the neighboring base station through a preset Xn interface; or sending the request message to the neighboring base station through a newly added inter-base station interface.

4. The method according to claim 3, wherein sending the request message to the neighboring base station through the preset Xn interface comprises:

sending the request message to the neighboring base station through a preset Xn interface setup request signaling.

5. The method according to claim 1, wherein determining the response information of the neighboring base station to the request message comprises:

receiving a response message of the neighboring base station to the request message through the inter-base station interface; and determining the unlicensed spectrum support capability information of the neighboring base station according to the response message.

6. The method according to claim 5, wherein receiving the response message of the neighboring base station to the request message through the inter-base station interface comprises:

receiving a response message of the neighboring base station to the request message through a preset Xn interface; or receiving a response message of the neighboring base station to the request message through a newly added inter-base station interface.

7. The method according to claim 6, wherein receiving the response message of the neighboring base station to the request message through the preset Xn interface comprises:

receiving a response message of the neighboring base station to the request message through a preset Xn interface setup response signaling.

8. The method according to claim 1, wherein determining the response information of the neighboring base station to the request message comprises:

determining a response waiting duration according to a timing in response to determining that the request message is sent; and in response to determining no response message is received until the response waiting duration is equal to a preset time threshold, determining that the neighboring base station does not support serving a cell in the unlicensed spectrum.

9. A mobility management method, comprising:

receiving, by a base station in a 5G new radio (NR) system, a request message from a neighboring base station in response to setting up an inter-base station interface with the neighboring base station, wherein the request message requests to obtain unlicensed spectrum support capability information of the base station, and the neighboring base station is an NR unlicensed (NR-U) base station deployed independently in an unlicensed spectrum in the 5G NR system; and determining, by the base station, a response way to the request message according to the unlicensed spectrum support capability information of the base station, wherein the response way instructs the neighboring base station to perform mobility management on user equipment in a serving cell, wherein the unlicensed spectrum support capability information comprises an unlicensed spectrum support capability and a deployment mode in an unlicensed spectrum;

wherein the unlicensed spectrum support capability comprises at least one of following parameters: preset capability indication information for indicating whether the base station supports operation in the unlicensed spectrum, or an operation frequency range of the base station in the unlicensed spectrum; and wherein the deployment mode in the unlicensed spectrum comprises an independent deployment mode or a non-independent deployment mode; and wherein response information is determined by the response way, wherein if the response information indicates that the base station in the 5G NR system supports an independent deployment NR-U mode, the response information is used for the neighboring base station to determine to inform NR-U user equipment in the serving cell to take the base station in the 5G NR system as a candidate base station for handover measurement.

10. The method according to claim 9, wherein determining the response way to the request message according to the unlicensed spectrum support capability information of the base station comprises:

sending a response message to the request message to the neighboring base station through a preset inter-base station interface according to the unlicensed spectrum support capability information of the base station; or refusing to respond to the request message in response to determining that the base station does not support the independent deployment mode in the unlicensed spectrum.

11. The method according to claim 10, wherein sending the response message to the request message to the neighboring base station through the preset inter-base station interface comprises:
sending the response message to the neighboring base station through a preset Xn interface; or
sending the response message to the neighboring base station through a newly added inter-base station interface.

12. The method according to claim 11, wherein sending the response message to the neighboring base station through the preset Xn interface comprises:
sending the response message to the neighboring base station through a preset Xn interface setup response signaling.

13. The method according to claim 9, wherein the request message further comprises: mode indication information and unlicensed spectrum support capability information of the neighboring base station;
wherein the mode indication information indicates an independent deployment mode of the neighboring base station in the unlicensed spectrum; and
wherein the unlicensed spectrum support capability information indicates an operation frequency range of the neighboring base station in the unlicensed spectrum.

14. The method according to claim 13, further comprising:
performing mobility management on the user equipment in the serving cell according to the mode indication information and the unlicensed spectrum support capability information of the neighboring base station.

15. A base station, comprising:
a processor; and
a memory storing instructions executable by the processor;
wherein the processor is configured to:
send a request message to a neighboring base station in response to setting up an inter-base station interface with the neighboring base station, wherein the request message requests to obtain unlicensed spectrum support capability information of the neighboring base station, wherein the base station is a new radio unlicensed (NR-U) base station independently deployed in an unlicensed spectrum in a 5G new radio (NR) system;
determine response information of the neighboring base station to the request message; and
perform mobility management on user equipment in a serving cell according to the response information,
wherein the unlicensed spectrum support capability information comprises an unlicensed spectrum support capability and a deployment mode in an unlicensed spectrum;
wherein the unlicensed spectrum support capability comprises at least one of following parameters: preset capability indication information for indicating whether the base station supports operation in the unlicensed spectrum, or an operation frequency range of the base station in the unlicensed spectrum;
wherein the deployment mode in the unlicensed spectrum comprises an independent deployment mode or a non-independent deployment mode; and
wherein if the response information indicates that the neighboring base station supports an independent deployment NR-U mode, the response information is used for the NR-U base station to determine to inform NR-U user equipment in the serving cell to take the neighboring base station as a candidate base station for handover measurement.

16. A base station, comprising:
a processor; and
a memory storing instructions executable by the processor;
wherein the processor is configured to perform the method according to claim 9.

* * * * *